United States Patent [19]

Lohse et al.

[11] 4,284,755
[45] Aug. 18, 1981

[54] N-SUBSTITUTED ASPARTIC ACID DERIVATIVES AS CURING AGENTS FOR EPOXIDE RESINS

[75] Inventors: Friedrich Lohse, Oberwil; Friedrich Stockinger, Hölstein; Sameer H. Eldin, Birsfelden, all of Switzerland

[73] Assignee: Ciba-Geigy Corporation, Ardsley, N.Y.

[21] Appl. No.: 145,076

[22] Filed: Apr. 30, 1980

[30] Foreign Application Priority Data

May 8, 1979 [CH] Switzerland .......................... 4305/79

[51] Int. Cl.³ .............................................. C08G 59/52
[52] U.S. Cl. .................................... 528/111; 528/114; 528/328; 560/38; 560/39; 560/44; 560/145; 560/169
[58] Field of Search ..................... 560/38, 39, 44, 145, 560/169; 528/111, 114, 328; 525/533

[56] References Cited

U.S. PATENT DOCUMENTS

| | | | |
|---|---|---|---|
| 2,761,874 | 9/1956 | Bersworth et al. | 560/169 X |
| 2,989,498 | 6/1961 | MacKenzie et al. | 260/47 |
| 4,026,915 | 5/1977 | Billman et al. | 560/169 X |

OTHER PUBLICATIONS

Laliberte et al., "Improved Synthesis of N-Alkyl-aspartic Acids", Canadian J. Chem. 40, 163–165, (1962).
Zilkha et al., "Synthesis of N-Alkyl-aspartic Acids and N-Alkyl-asparagines", J. Org. Chem. 24, 1096–1098, (1959).

*Primary Examiner*—Earl A. Nielsen
*Attorney, Agent, or Firm*—Harry Falber

[57] ABSTRACT

N-Substituted aspartic acid monoesters of the formula

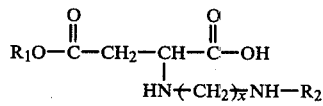

wherein for example $R_1$ is an alkyl group having 1 to 12 C atoms, a cyclohexyl, phenyl, tolyl or benzyl group, $R_2$ is an alkyl group having 3 or 4 C atoms, or a cyclohexyl, phenyl, tolyl or methoxyphenyl group, and x is 2 or 3, are obtained by adding, by means of an addition reaction, to 1 mol of a maleic acid monoester of the formula

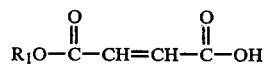

1 mol of an amine of the formula

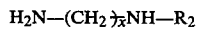

in the presence of a tertiary amine. The novel N-substituted aspartic acid monoesters are valuable curing agents for epoxide resins, and are particularly suitable for producing storage-stable B-stage resins.

9 Claims, No Drawings

N-SUBSTITUTED ASPARTIC ACID DERIVATIVES AS CURING AGENTS FOR EPOXIDE RESINS

The present invention relates to N-substituted aspartic acid monoesters, to processes for producing them, and to the use of the novel N-substituted aspartic acid monoesters as curing agents for epoxide resins, particularly for producing B-stage resins.

Curable epoxide resin mixtures in which the epoxide resin and the curing agents are present in equivalent amounts are usually not storage-stable at room temperature since the crosslinking of the epoxide resins gradually proceeds. In order to increase the stability of curable epoxide resin mixtures, there has been adopted the procedure of modifying both the epoxide resin and the curing agent by advancing the epoxide resin or the curing agent with appropriate reaction components using the so-called "advancement process", or by pre-reacting the epoxide resin with the curing agent, by which means epoxide resins which can still be cured and melted are obtained. If the epoxide resin and the curing agent in the pre-reaction are present in equivalent amounts, there are obtained the so-called B stage resins, which can be converted, without further addition of curing agents, by heating alone into the completely crosslinked condition (C stage).

From the German Auslegeschrift No. 1,061,067 it is already known that by preliminary reaction of epoxide resins with a 4,4'-diaminodiarylalkane, products having prolonged storage-stability are obtained, these products having very good processing characteristics as moulding materials, that is to say, when heat and pressure are applied. It is however not disclosed in this German Auslegeschrift how the storage stability of these moulding materials was measured. The present comparative tests now show that the reactivity of a B-stage resin produced from bisphenol-A-diglycidyl ether and 4,4'-diaminodiphenylmethane rapidly decreases within a few days during storage at room temperature, so that B-stage resins of this type are no longer suitable after this storage time for other applications, for example as sintering-powder coatings or as casting resins.

It has now been found that by reaction of maleic acid monoesters with specific diamines, there are obtained N-substituted aspartic acid monoesters which are valuable curing agents for epoxide resins, and which can be processed with epoxide resins into B-stage resins having excellent storage stability.

The present invention hence relates to novel N-substituted aspartic acid monoesters of the formula I

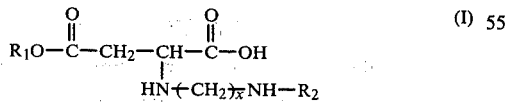

wherein $R_1$ is an alkyl group which has 1 to 12 C atoms and which optionally contains ether oxygen atoms, or it is a cyclohexyl, phenyl, tolyl or benzyl group, $R_2$ is an alkyl group having 3 or 4 C atoms, or it is a cyclohexyl, phenyl, tolyl or methoxyphenyl group, and x is the number 2 or 3.

Preferably, in the formula I, $R_1$ is an alkyl group having 1 to 6 C atoms or a cyclohexyl group, $R_2$ is a tert-butyl or cyclohexyl group, and x is the number 3.

$R_1$ as alkyl can have for example the following meanings:

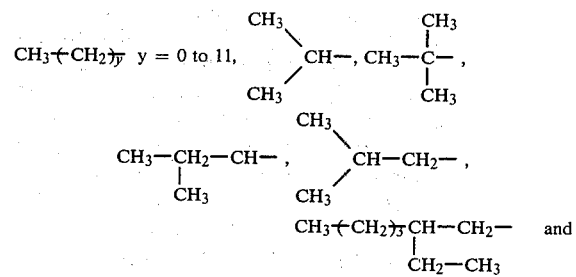

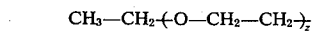
$z = 1$ to 3.

As suitable alkyl groups for $R_2$, there may be mentioned for example: isopropyl, sec-butyl and tert-butyl.

The aspartic acid derivatives of the formula I can be produced, using the processes described in "Journal of Organic Chemistry", Volume 24 (1959), pp. 1096-98, and in "Canadian Journal of Chemistry", Volume 40 (1962), pp. 163-5, by adding, by means of an addition reaction, to 1 mol of a maleic acid monoester of the formula II

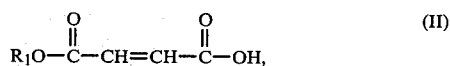

wherein $R_1$ has the same meaning as in the formula I, 1 mol of an amine of the formula III

wherein $R_2$ and x have the same meanings as in the formula I, in the presence of a tertiary amine.

A compound of the formula I according to the invention is preferably produced by starting with a maleic acid monoester of the formula II wherein $R_1$ is an alkyl group having 1 to 6 C atoms or a cyclohexyl group, and reacting this maleic acid monoester with an amine of the formula III wherein $R_2$ is preferably a tertiary butyl group or a cyclohexyl group, and x is 3, in the presence of triethylamine or pyridine, particularly triethylamine. The maleic acid monoesters of the formula II are known (cp. for example Canadian Journal of Chemistry, Vol. 40 (1962), pp. 163-5). Also the amines of the formula III are known compounds.

As mentioned in the foregoing, the aspartic acid derivatives according to the invention are valuable curing agents for epoxide resins, and are especially suitable for producing storage-stable B-stage resins which at room temperature are stable for virtually an unlimited length of time, and undergo no significant change with regard to their reactivity.

The B-stage resins can be produced by mixing the epoxide resins in equivalent amounts with the aspartic acid derivatives according to the invention (1 epoxide equivalent to 1 amine hydrogen equivalent), and then melting them together until the mixture has become homogeneous and the exothermic reaction occurring during the melting together process has subsided. The reaction mixture is subsequently cooled to room temperature and optionally ground. After weeks of storage at room temperature, the B-stage resins can again be converted by heating into the liquid state and can then be completely cured (crosslinked), optionally whilst being shaped.

All known types of epoxide resins are essentially suitable for producing B-stage resins. Those which may be mentioned are for example: in particular epoxide compounds having on average more than one glycidyl group, β-methylglycidyl group or 2,3-epoxycyclopentyl group, each bound to a hetero atom (for example sulfur, preferably oxygen or nitrogen), such as in particular bis-(2,3-epoxycyclopentyl)-ether; di- or polyglycidyl ether of polyhydric aliphatic alcohols, such as 1,4-butanediol, or polyalkylene glycols such as polypropylene glycols; di- or polyglycidyl ethers of cycloaliphatic polyols, such as 2,2-bis-(4-hydroxycyclohexyl)-propane; di- or polyglycidyl ethers of polyvalent phenols, such as resorcin, bis-(p-hydroxyphenyl)-methane, 2,2-bis-(p-hydroxyphenyl)-propane (diomethane), 2,2-bis-(4'-hydroxy-3',5'-dibromphenyl)-propane, 1,1,2,2-tetrakis-(p-hydroxyphenyl)-ethane, or condensation products of phenols with formaldehyde, obtained under acid conditions, such as phenol-novolaks and cresol-novolaks; di- or poly(β-methylglycidyl)-ethers of the above-mentioned polyhydric alcohols or polyvalent phenols; polyglycidyl esters of polyvalent carboxylic acids, such as phthalic acid, terephthalic acid, Δ⁴-tetrahydrophthalic acid and hexahydrophthalic acid; N-glycidyl derivatives of amines, amides and heterocyclic nitrogen bases, such as N,N-diglycidylaniline, N,N-diglycidyltoluidine, N,N,N',N'-tetraglycidyl-bis(p-aminophenyl)-methane; triglycidylisocyanurate; N,N'-diglycidylethyleneurea; N,N'-diglycidyl-5,5-dimethyl-hydantoin, N,N'-diglycidyl-5-isopropylhydantoin; and N,N'-diglycidyl-5,5-dimethyl-6-isopropyl-5,6-dihydrouracil.

Suitable epoxide compounds are also alicyclic diepoxides, such as vinylcyclohexenedioxide, limonenedioxide, dicyclopentadienedioxide, ethylene glycol-bis(3,4-epoxytetrahydrocyclopentadien-8-yl)-glycidyl ethers, as well as compounds having two epoxycyclohexyl radicals, such as diethylene glycol-bis-(3,4-epoxycyclohexanecarboxylate), bis-3,4-(epoxycyclohexylmethyl)-succinate, 3',4'-epoxy-6'-methylcyclohexylmethyl-3,4-epoxy-6-methylcyclohexanecarboxylate and 3',4'-epoxyhexahydrobenzal-3,4-epoxycyclohexane-1,1-dimethanol.

EXAMPLE 1

N-(3'-Cyclohexylaminopropyl)-aspartic acid-4-methyl ester 356 g (3.4 mols+14% excess) of maleic acid monomethyl ester are placed into a glass flask provided with stirrer, thermometer, condenser and dropping funnel, and, with vigorous stirring and ice-water cooling, 480 ml of triethylamine are added dropwise at 5°–8° C. internal temperature within 2 hours. 372.6 g (2.4 mols) of 3-cyclohexylaminopropylamine are then quickly introduced; the exothermic reaction is subsequently allowed to subside, and the reaction mixture is heated within 30 minutes to 85° C., in the course of which the reaction product crystallises out. After the reaction has finished, the temperature is lowered to room temperature; the product is mixed with 1100 ml of acetone and is filtered off; the filter residue is again mixed with 900 ml of acetone, and the suspension is filtered; the filter residue is then washed with acetone, and the product is dried at 60° C. and 53.2 mbars. The yield is 555.4 g (87.2% of theory) of a white crystalline aspartic acid derivative, which decomposes at 163° C.

| Elementary analysis | |
|---|---|
| calculated | found |
| 58.72% C | 58.84% C |
| 9.15% H | 9.27% H |
| 9.78% N | 9.83% N |

The 100 MHz-¹H-NMR spectrum is in agreement with the following structure:

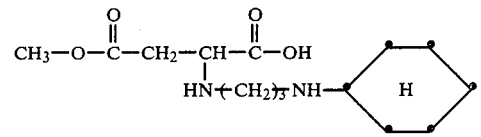

EXAMPLE 2

N-(3'-Cyclohexylaminopropyl)-aspartic acid-4-ethyl ester

In a manner analogous to that of Example 1, 394.3 g (2.4 mols+14% excess) of maleic acid-monoethyl ester are placed into the glass flask, and 480 ml of triethylamine are added dropwise with cooling. There are subsequently added 372.6 g (2.4 mols) of 3-cyclohexylaminopropylamine, and the reaction mixture is reacted for 25 minutes at 84°–86° C. It is further processed according to Example 1 and the yield is 546.8 g (75.7% of theory) of a white crystalline aspartic acid derivative, which decomposes at 152° C.

| Elementary analysis | |
|---|---|
| calculated | found |
| 59.88% C | 60.22% C |
| 9.38% H | 9.43% H |
| 9.31% N | 9.44% N. |

The 100 MHz-¹-H-NMR spectrum and mass spectrum are in agreement with the following structure:

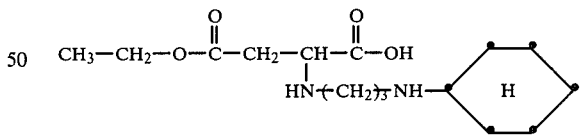

EXAMPLE 3

N-(3'-Cyclohexylaminopropyl)-aspartic acid-4-isopropyl ester

In a manner analogous to that of Example 1, 400 ml of triethylamine are added to 350.2 g (2.0 mols+10% excess) of maleic acid-monoisopropyl ester, and the mixture is subsequently reacted with 311.3 g (2.0 mols) of 3-cyclohexylamino-1-propylamine at 59°–85° C. for 35 minutes. The reaction mixture is further processed in the manner described in Example 1 to yield 515 g (82.2% of theory) of the desired aspartic acid derivative, which decomposes at 151°–152° C.

| Elementary analysis | |
|---|---|
| calculated | found |
| 61.32% C | 61.25% C |
| 9.33% H | 9.56% H |
| 8.94% N | 8.98% N. |

The 100 MHz-¹NMR spectrum is in agreement with the following structure:

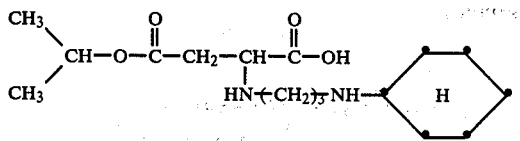

EXAMPLE 4

N-(3'-Cyclohexylaminopropyl)-aspartic acid-4-cyclohexyl ester 400 ml of triethylamine are added dropwise to a solution of 433.8 g (2 mols+10% excess) of maleic acid-monocyclohexyl ester and 200 ml of dioxane, in a manner analogous to that of Example 1, and the mixture is then reacted with 310.5 g (2.0 mols) of 3-cyclohexylamino-1-propylamine for 40 minutes at 70°–90° C. The reaction mixture is further processed as in Example 1 to yield 604 g (85.2% of theory) of a white crystalline aspartic acid derivative, which decomposes at 172°–173° C.

| Elementary analysis | |
|---|---|
| calculated | found |
| 64.38% C | 64.57% C |
| 9.67% H | 9.66% H |
| 7.90% N | 8.01% N. |

The 100 MHz-¹H-NMR spectrum is in agreement with the following structure:

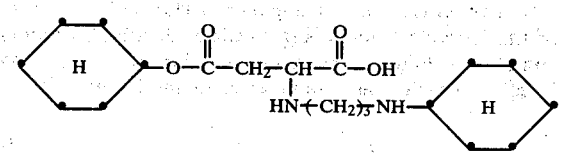

EXAMPLE 5

N-(3'-tert-Butylaminopropyl)-aspartic acid-4-ethyl ester

In a manner analogous to that of Example 1, 400 ml of triethylamine are added to 317 g (2.2 mols) of maleic acidmonoethyl ester, and the mixture is subsequently reacted with 260 g (2.0 mols) of 3-tert-butylaminopropylamine. The reaction mixture is further processed as in Example 1 to yield 423.4 g (77.2% of theory) of a white crystalline aspartic acid derivative, which melts at 174°–175° C. after recrystallisation in a mixture of ethanol/acetone (1:3).

| Elementary analysis | |
|---|---|
| calculated | found |
| 55.59% C | 55.53% C |

| Elementary analysis | |
|---|---|
| calculated | found |
| 9.33% H | 9.13% H |
| 9.97% N | 10.05 N |
| 2.38% H₂O | 2.38% H₂O. |

The 100 MHz-¹NMR spectrum is in agreement with the following structure

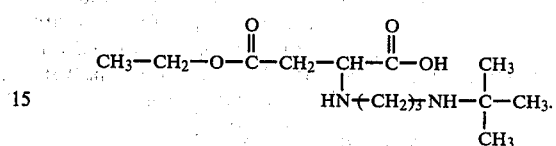

EXAMPLE 6

N-(2'-Phenylaminethyl)-aspartic acid-4-benzyl ester

In the manner described in Example 1, 40 ml of triethylamine are added to a mixture of 41.2 g (0.20 mol) of maleic acid-monobenzyl ester and 15 ml of dioxane, and the mixture is subsequently reacted with 27.2 g (0.20 mol) of N-phenyl-1,2-diaminoethane for 20 minutes at 85° C. The reaction product is further processed as in Example 1 to yield 53.0 g (77.4% of theory) of the aspartic acid derivative expected.

The compound melts at 194° C. after recrystallisation in dimethylformamide.

| Elementary analysis | |
|---|---|
| calculated | found |
| 66.65% C | 66.32% C |
| 6.48% H | 6.48% H |
| 8.18% N | 8.48% N. |

The 100 MHz-¹-NMR spectrum is in agreement with the following structure:

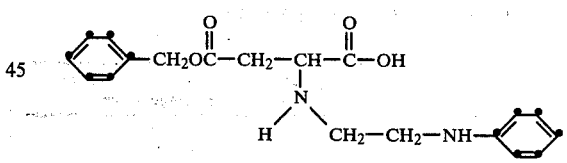

Application Examples

EXAMPLE I:

Production of a B-stage resin from a liquid epoxide resin and N-(3'-cyclohexylaminopropyl)-aspartic acid-4-cyclohexyl ester as curing component 100 g of a liquid epoxide resin based on bisphenol-A and epichlorohydrin, with an epoxide content of 5.2 equivalents/kg, are heated in a tin can to 130° C. 61.3 g of N-(3'-cyclohexylaminopropyl)-aspartic acid-4-cyclohexyl ester (produced according to Example 4) are mixed, in a finely pulverised form, into the epoxide resin (corresponding to a ratio of 1 amine hydrogen equivalent to 1 epoxide equivalent). The temperature slowly rises within about 12 minutes to 150°–170° C., and the aspartic acid ester goes slightly into solution. The reaction subsides after 5–10 minutes, and the fairly viscous mass is poured onto aluminium sheet. After cooling, the B-stage resin obtained can be easily pulverised. This is the B-stage resin A.

Comparative Example 1:

Production of a B-stage resin from a liquid epoxide resin and diaminodiphenylmethane as curing component 100 g of a bisphenol-A-diglycidyl ether having an epoxide content of 5.3 equivalents/kg are placed into a tin can. 26.2 g of 4,4'-diaminophenylmethane (corresponding to 1 amine hydrogen equivalent to 1 epoxide equivalent) are dissolved in the epoxide resin at 50° C., and the mixture is subsequently pre-reacted for 4 hours at this temperature. The viscous mixture is poured out onto aluminium sheet, and the B-stage resin is pulverised after 24 hours. This is the B-stage resin B.

Comparative Example 2:

Production of a B-stage resin from a liquid epoxide resin and a solid epoxide resin as well as from diaminodiphenylmethane as curing component 30 g of a bisphenol-A-diglycidyl ether having an epoxide content of 5.3 equivalents/kg and 17.5 g of 4,4'-diaminodiphenylmethane (melted) are mixed together at 50° C. for 5 minutes. To this mixture are then added 70 g of solid epoxide resin based on bisphenol-A, and epichlorohydrin, having an epoxide content of 1.94 equivalents/kg, melted at 90°–100° C. The whole is thoroughly mixed for 2–3 minutes and the viscous mass is immediately poured out onto aluminium sheet. After cooling, the B-stage resin is ground and pulverised. This is the B-stage resin C.

Comparison of the storage stability of the B-stage resins A, B and C 50 g of each of the B-stage resins A, B and C were stored in small sealed flasks at room temperature, and the reactivity was periodically checked by gelling-time measurements at elevated temperature. In these tests, the B-stage resin A produced with use of the N-(3'-cyclohexylaminopropyl)aspartic acid-4-cyclohexyl ester according to the invention gave an incomparably better storage stability than that given by the B-stage resins B and C taken as a comparison.

| B-stage resin | Percentage change in gelling time after storage at room temperature | |
|---|---|---|
| A | 0–3%[1] | after 75 days, |
| B | 55%[2] | after 2 days, |
|   | 76% | after 5 days, |
| C | 17–28%[3] | after 7.5 days, |
|   | 49–61% | after 75 days. |

[1]temperature at which gelling time was measured: 160, 180 and 200° C.,
[2]temperature at which gelling timw was measured: 120°C.,
[3]temperature at which gelling time was measured: 100° C. and 160° C.

Example II:

Production of a storage-stable powder system formed from solid epoxide resin and N-(3'-cyclohexylaminopropyl)-aspartic acid-4-cyclohexyl ester 100 g of a solid epoxide resin based on bisphenol-A and epichlorohydrin having an epoxide content of 1.1 equivalents/kg are preliminarily ground in a ball mill for 16 hours. 5 g of an N-(3'-cyclohexylaminopropyl)-aspartic acid-4-cyclohexyl ester already in pulverulent form (corresponding to a ratio of 1 equivalent of amine hydrogen atom to 1 equivalent of epoxide group) are added, and the whole is ground as finely as possible in a ball mill for 3 hours, and simultaneously thoroughly mixed. The storage stability was tested in a manner analogous to that described in the preceding Example, the storage temperature being however this time 40° C. After 30 days' storage at this temperature, a change in reactivity of <1% was measured, a result corresponding to a very good storage stability. The novel powder system was moreover pourable at the end of the storage period.

What is claimed is:

1. An N-substituted aspartic acid monoester of the formula I

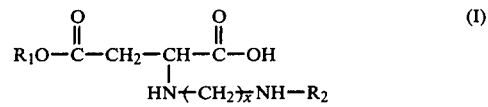

wherein $R_1$ is an alkyl group which has 1 to 12 C atoms and which optionally contains ether oxygen atoms, or it is a cyclohexyl, phenyl, tolyl or benzyl group, $R_2$ is an alkyl group having 3 or 4 C atoms, or it is a cyclohexyl, phenyl, tolyl or methoxyphenyl group, and x is the number 2 or 3.

2. An aspartic acid derivative according to claim 1, wherein, in the formula I, $R_1$ is an alkyl group having 1 to 6 C atoms or a cyclohexyl group, $R_2$ is a tert-butyl or cyclohexyl group, and x is the number 3.

3. N-(3'-Cyclohexylaminopropyl)-aspartic acid-4-methyl ester as a compound of the formula I according to claim 1.

4. N-(3'-Cyclohexylaminopropyl)-aspartic acid-4-ethyl ester as a compound of the formula I according to claim 1.

5. N-(3'-Cyclohexylaminopropyl)-aspartic acid-4-isopropyl ester as a compound of the formula I according to claim 1.

6. N-(3'-Cyclohexylaminopropyl)-aspartic acid-4-cyclohexyl ester as a compound of the formula I according to claim 1.

7. N-(3'-tert-Butylaminopropyl)-aspartic acid-4-ethyl ester as a compound of the formula I according to claim 1.

8. A process for producing an aspartic acid derivative of the formula I according to claim 1, which process comprises adding, by means of an addition reaction, to 1 mol of a maleic acid monoester of the formula II

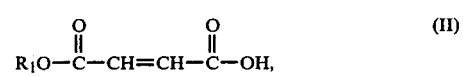

wherein $R_1$ has the same meaning as in the formula I, 1 mol of an amine of the formula III

wherein $R_2$ and x have the same meanings as in the formula I, in the presence of a tertiary amine.

9. B-Stage resins formed from the aspartic acid derivatives of the formula I according to claim 1 and epoxide resins, which B-stage resins are obtained by reacting, in equivalent amounts at elevated temperature, the aspartic acid derivatives with epoxide resins containing on average more than one epoxide group per molecular, and, after the exothermic reaction occurring has subsided, cooling the resulting reaction product to room temperature, and optionally pulverising it.

* * * * *